March 15, 1932.  E. BUSSEI  1,849,611
PROCESS AND APPARATUS FOR ASCERTAINING THE ORDNANCE
DATA NECESSARY FOR FIRING MISSILES INTO THE AIR
Filed Nov. 12, 1930   3 Sheets-Sheet 1
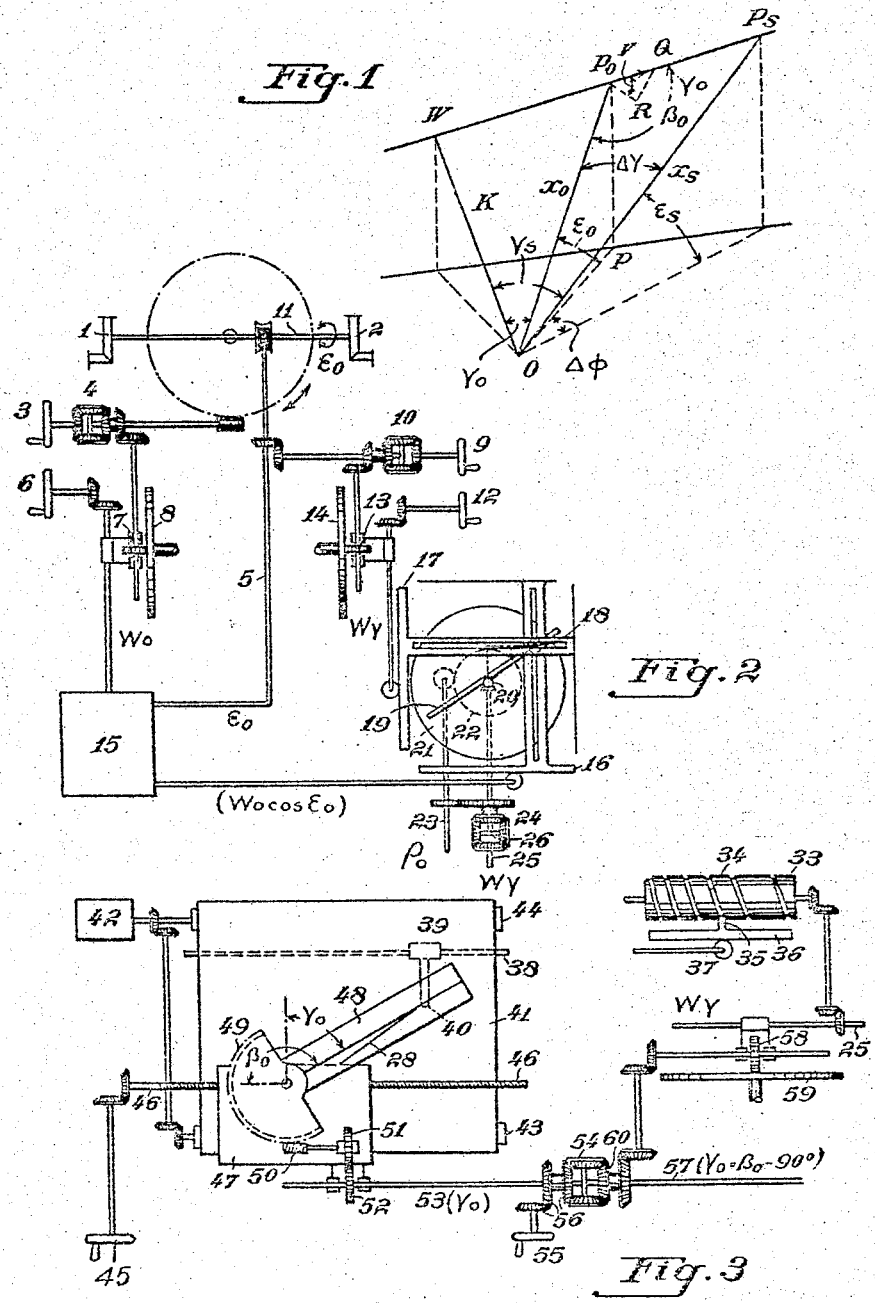
Inventor:
Ettore Bussei
by Gross & Kehlenbeck
Attorneys

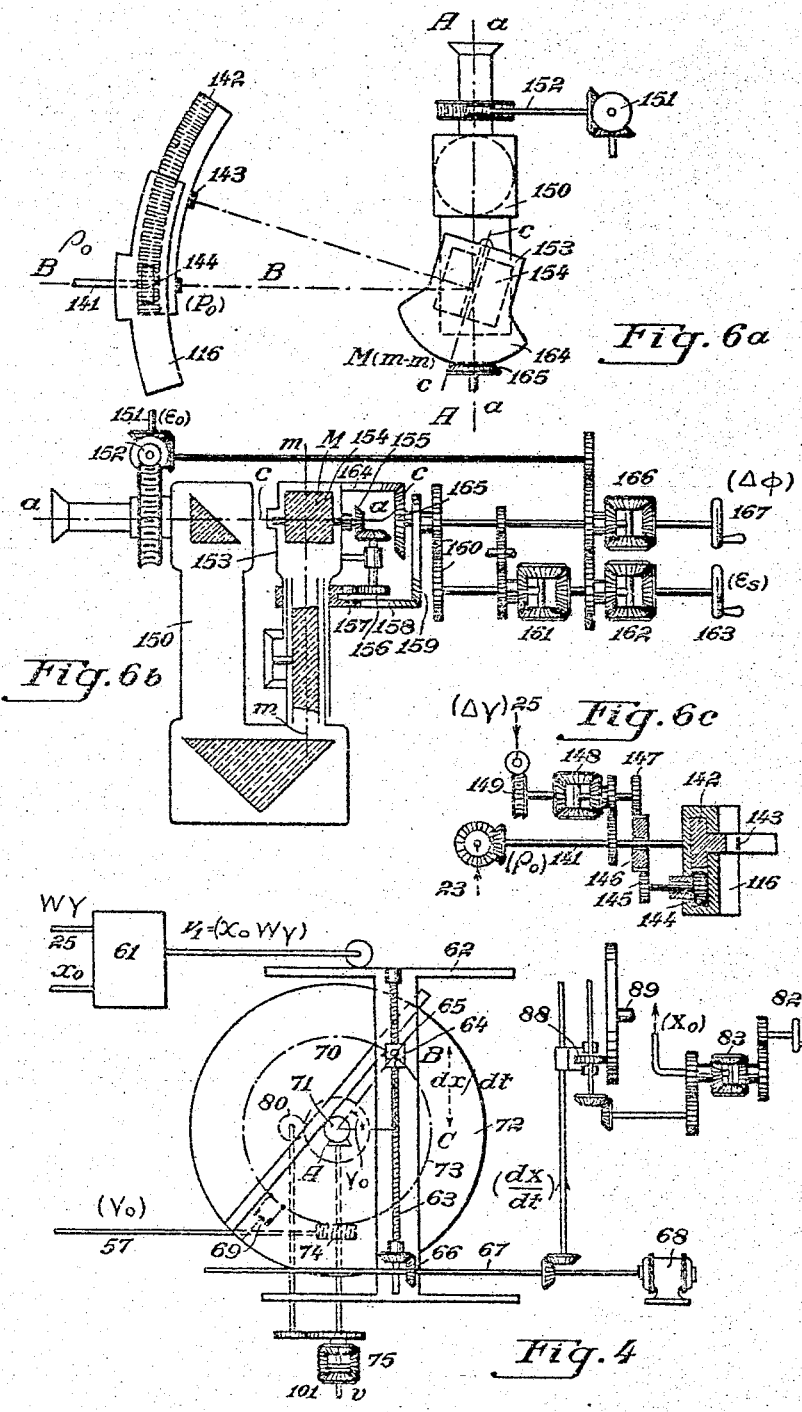

March 15, 1932. E. BUSSEI 1,849,611
PROCESS AND APPARATUS FOR ASCERTAINING THE ORDNANCE
DATA NECESSARY FOR FIRING MISSILES INTO THE AIR
Filed Nov. 12, 1930 3 Sheets-Sheet 3

Inventor:
Ettore Bussei
by Lotka & Kehlenbeck
Attorneys.

Patented Mar. 15, 1932

1,849,611

UNITED STATES PATENT OFFICE

ETTORE BUSSEI, OF FLORENCE, ITALY, ASSIGNOR TO OFFICINE LOMBARDE APPARECCHI DI PRECISIONE O. L. A. P. SOCIETE ANONIMA, OF MILAN, ITALY

PROCESS AND APPARATUS FOR ASCERTAINING THE ORDNANCE DATA NECESSARY FOR FIRING MISSILES INTO THE AIR

Application filed November 12, 1930, Serial No. 495,136, and in Italy July 29, 1929.

The invention relates to a process and apparatus for ascertaining the ordnance data necessary for firing missiles into the air.

Control apparatus for mechanically directing anti-air-craft fire are known which give the path of the object aimed at in order to obtain indication of necessary data for the firing of the missile, also such apparatus which use the chord of the projectile path (chart distance) or calculate the required values by means of calculating mechanisms according to a determined formula either mechanically or electromagnetically. It is assumed in most cases that the object aimed at is flying in a straight horizontal path because consideration of the variations of height in inclined flight would considerably complicate the calculating device.

With the help of mechanical and optical calculating devices the present invention solves the problem even for general cases of inclined flight whereby the only assumption made is that the speed of the object aimed at remains constant in velocity and direction from the moment the shot is fired until it hits the object aimed at. This is obtained according to the invention in that on the basis of values obtained by constant observation of the object aimed at, first the plane including the direction or line of flight and the spotting or observation point is determined, then the position of the path of flight of the object aimed at said object being constantly in the first plane, as also the position of the path of the missile in this plane and finally from these determinations, the components corresponding to the angular displacement of the gun are obtained by optically mechanical means.

One form of construction of the invention is shown by way of example in the drawings, in which:

The position of the path of the object aimed at and the data for determining its magnitude is shown diagrammatically in Figure 1.

Figure 2 is a partly diagrammatic showing of a device for ascertaining the position of the plane of flight and of the angular velocity.

Figure 3 shows diagrammatically a device for continually ascertaining by graphical means the angle of intersection between the path of the object aimed at and the direction of the same.

Figure 4 shows diagrammatically a device for ascertaining the velocity of the object aimed at from its diagonal components and from its direction.

Fig. 6a is a top plan view of one form of construction of a mechanism for the optical mechanical conversion of the projection intersecting the plane of flight into the angle values corresponding to the movements of the gun.

Figures 6b and 6c are cross sections on the lines AA and BB respectively of Figure 6a.

Figure 5:
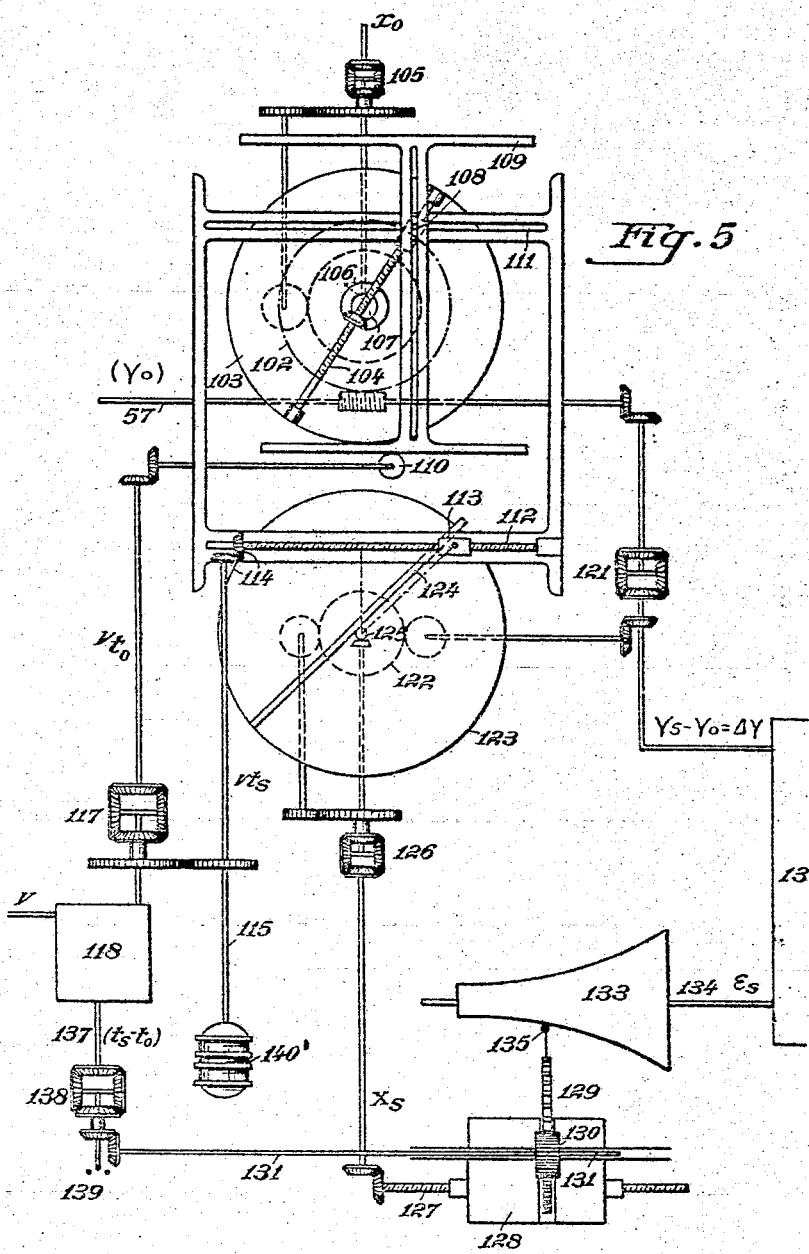
Figure 5 is a partly diagrammatic showing of a form of construction of the device for ascertaining the position of the path of the object aimed at with regard to the spotting or (observation) point and the position of the point of impact on this path of the missile.

In Figure 1, O is the place of discharge that is to say the spotting point, for instance the place where the gun is situated, $WP_o P_s$ is the path of flight, $OWP_o P_s$ the plane of flight, $OP_o P$ the plane of the object aimed at, W the point of intersection of the perpendicular K from O to the path of the target, K the shortest range, $P_o$ the momentary position of the object aimed at, $x_o$ the corresponding range, $P_s$ the point of contact, $x_s$ the respective range of the point of contact, $\epsilon_o$ the angle of inclination of the object aimed at, $\epsilon_s$ the angle of inclination to the point of contact angle $OP_o P_s = \beta_o$, the angle of intersection between the path of the object aimed at and the momentary direction of the same from the gun or point of observation.

If we represent the horizontal and vertical angle velocities of the path of the object aimed at by $W_o$, $W_v$ and its angle velocity in the plane of flight by $W\gamma$ and further the angle of inclination of the plane of flight towards the plane of the object aimed at by $\rho_o$ a mathematical calculation results in:

$$\tan \rho_o = \frac{W_o \cdot \cos \cdot \epsilon_o}{W_v}$$

$$W\gamma_2 = (W_o \cdot \cos \cdot \epsilon_o)^2 + W_v^2$$

The angle $\rho_o$, and therefore the position, the plane of flight with regard to the momentary direction of the object aimed at and the angular velocity in the plane of flight are determined by means of $W_o$, $W_v$ and $\epsilon_o$.

The velocity $v = P_oQ$ of the object aimed at has the two components RQ in the plane of flight, in the direction of the line of sight of the object aimed at and equal to the unit variation of range $$\frac{dx}{dt}$$

of the object aimed at, and $P_oR = v_1$ diagonally to the direction of the object aimed at and equal to the product of the angular velocity $\omega\gamma$ and the range $x_o$. This second component forms the angle $QP_oR = \gamma_o = \beta_o - 90°$ with the direction of the velocity. The value of $$\frac{dx}{dt}$$

to be determined from the successive range values and the product $(W\gamma.x_o)$ obtainable from the measured range $x_o$ and the angular velocity $\omega\gamma$ would make it possible therefore to ascertain the velocity $v$ of the object aimed at in value and direction.

If the value $$\frac{dx}{dt}$$

cannot be obtained with sufficient accuracy from the range measurements, the velocity $v$ can according to this invention, be also determined from the components $v_1$ or $\omega\gamma.x_o$ and from the angle $QP_oR = \gamma_o$ (or $\beta_o$) whilst the angular velocity $W\gamma$ is ascertained separately with the help of the angle velocities. By mathematical calculations it is found that the tangent to the curve which is obtained if the reciprocal value $$\frac{1}{2\omega\gamma}$$

is entered in the function of time $t$ in a right-angled co-ordinate system forms an angle $\gamma_o$ corresponding to the angle between the tangent to the curve at the momentary position of the object and the direction of the $y$ axis. In determining the velocity $v$ of the object aimed at from $v_1$ and $\gamma_o$ the value $$\frac{dx}{dt}$$

is obtained in addition.

The right angled triangle OWP which gives the distance K and the path of flight $WP_o$ can be obtained by means of the angle $\gamma_o$ and the range $x_o$ to the point of the object aimed at at the given moment. The duration $t_o$ of the flight of the object aimed at from the point of intersection W to the place of the object aimed at $P_o$ is also known by the flying tract $WP_o$ as $v$ has already been ascertained. If the duration of the flight of the object aimed at from W to the point $P_s$ is equal to $t_s$ then $P_oP_s = v(t_s - t_o)$ and if $P_s$ is the point of contact then the difference in time $(t_s - t_o)$ is equal to the time of flight T of the shot according to the shot table for the range $x_s = OP_s$ and the angle $P_oOP_s = \gamma_s - \gamma_o$ is qual to the value $\Delta\gamma$ in the plane of flight.

The mechanism shown in Figure 2 shows the sighting telescopes 1 and 2 which serve in known manner for following the object aimed at with the eye horizontally and vertically. The telescopes are adjusted horizontally upon the object aimed at by the crank 3 through the differential 4. They are then caused to follow the further horizontal movement of the object by the small friction wheel 7 which contacts with the driving gear 8 and is adjusted in relation to this gear by the crank 6. The setting of the crank 6 thus represents the horizontal angle velocity $W_o$ of the object while the arrangement 7, 8 applies continually to the telescopes the integral of said angle velocity. In the same way, the telescopes are adjusted vertically on the object by the crank 9 through the differential 10. The adjustment is then preserved through the friction wheel 13 driven by the large wheel 14 and adjusted across the face of this wheel by the crank 12, thus giving the vertical angle velocity $W_v$ while applying the actual angular change to the telescopes. The horizontal angle velocity $W_o$ is applied to a cosine multiplication arrangement 15 of any well known type such as that shown in the patent to Kaminski, No. 1,526,551, the method of operation of which is not described in detail here, which on the other side is influenced by the angular rotation of the hollow shaft 11 of two telescopes through the shaft 5 and therefore the vertex angle $\epsilon_o$ for the object aimed at is applied to the device 15 which constantly gives the product ($W_o \cdot \cos \epsilon_o$). This latter is applied to the actual mechanism for ascertaining $\rho_o$ and $W\gamma$ by a carriage 16 which is displaced by a screw arrangement on the shaft ($W_o \cdot \cos \epsilon_o$) from the centre of the disc 21 proportionately to this value. A second carriage 17 is displaced vertically to the direction of motion of this carriage proportionally to the vertical angular velocity $W_v$ (by a similar screw arrangement). Each of the two carriages has a slot arranged transversely to its direction of motion. These two slots guide a pin 18 which according to the above formulæ provides the end point of the vector of the angular velocity $W\gamma$ in the plane of flight. This pin in its turn guides a rack 19 radially displaceable on the disc 21 and in addition to its displacement effects a rotation of the disc 21 through the angle $\rho_0$ by its adjustment, this angle $\rho_0$ being obtained by the wheels 22 and the shaft 23. The radial displacement of the rack 19 proportionally to $W\gamma$ is taken up by the spur gear and bevel wheel 20 and is transmitted to the return differential 24 by which through gear connection to the shaft 23 the influence of the rotation of the disc on $W\gamma$ is compensated in known manner; the shaft 25 gives the value $W\gamma$.

In order to be able to eliminate variations in the adjustment of the end point of the vector $W\gamma$ caused by mechanical errors or errors in measuring, this end point can be shown if necessary in the mechanism according to Figure 2, by the point of intersection of two threads carried by the carriages 16 and 17 instead of a pin guided by slots. The adjustment of the carriage does not directly influence the further members provided for calculating the values but a marking is maintained in coincidence with that point of intersection in such a way that it does not follow the smaller variations in the adjustment of the point of intersection of the thread caused accidentally. One form of construction of the mechanism for continuously ascertaining the angle of intersection between the path of the object aimed at and the momentary direction of the same from the gun or point of observation is shown in Figure 3. The value derived from the shaft 25 of Figure 2 is applied to a cam cylinder 33 which translates the rotation of the cylinder proportional to $W\gamma$ into a displacement of the rack 36 proportional to $$\frac{1}{2W\gamma}$$

by means of a corresponding cam groove and a pin 35 guided therein. This displacement is taken up by the gear wheel 37 and transmitted as rotation to a spindle 38 which displaces the nut 39 provided with a marking pin 40. A marking band 41 is displaced with uniform velocity perpendicularly to the direction of motion of the spindle nut 39 for example by a clock-work 42. The marking pin 40 then traces a curve 28 which represents the curve of the above mentioned function $$\frac{1}{2W\gamma}.$$

For ascertaining the inclination of the tangent to this curve a transparent ruler 48 is provided which can be so displaced and rotated about its axis that it passes through the last marked point of the curve, which, considered mathematically, constitutes a parabola and immediately assumes the direction of the tangents to this point.

The axis of rotation of the ruler is disposed on a carriage 47 which can be displaced perpendicularly to the direction of motion of the marking band by the crank 45 by means of the spindle 46. The ruler at the same time can be rotated by the crank 55 through the wheels 56, differential 54, shaft 53 and further through the gear wheel 52 disposed on the carriage 47 and longitudinally displaceable on the shaft 53 as well as through the gear wheel 51—worm 50 and worm wheel segment 49. The angle of rotation of the ruler with regard to the direction of motion of the marking band results in the angle $\gamma_0$ which is derived from the shaft 57.

The following mechanism is provided for continuously ascertaining the angle $\gamma_0$ from one single adjustment of direction of the ruler 48:—The rotation proportional to $W\gamma$ is transmitted from the shaft 25 to a friction gearing integrator 59, the friction wheel 58 of which is displaced by a screw arrangement proportionally to $W\gamma$ so that the integrator continually forms the integral $\int W\gamma.dt$ in known manner, which is algebraically added through 60 in the differential 54 to the initial value of the angle $\gamma_0$ adjusted by the crank 55.

In Figure 4 a multiplication arrangement 61 of suitable construction (for instance, of the type shown in the patents to Meitner, 1,385,551; Barr) 1,493,095; Kaminski, 1,497,512; or Gaedke, 1,788,996) continually gives the product $v_1 = W\gamma.x_0$ from the values $W\gamma$ and $x_0$. A carriage 62 is displaced by a screw arrangement from the middle point of a disc 72 proportionally to this component of $v$. The carriage 62 supports a spindle 63, the nut 64 of which can be displaced by the shaft 67 through bevel wheels 66 perpendicularly to the direction of motion of the carriage 62 therefore corresponding to the direction of the component $$\frac{dx}{dt}$$

of $v$. A peg 65 of the nut 64 engages through a groove in the carriage 62 with a rack 70 radially displaceable on the disc 72. A displacement of the carriage 62 or of the nut 64 effects a rotation of the disc 72 in addition to a radial displacement of the rack 70. A worm wheel 73 is rotated by the worm 74 of the shaft 57 and carries the counter contact of a contact arrangement 69, the middle contact of which is secured to the disc 72. The contact arrangement operates for example a small electric motor 68 in such a way that it rotates the shaft 67 in the corresponding direction and therefore displaces the nut 64 until the rotation of the disc 72, effected by the displacement of the carriage 62, is proportional to $(W\gamma x_o)$, and the displacement of the nut 64 is equal to the angle $\gamma_o$, through which the worm wheel 73 was rotated by the shaft 57. The hypotenuse of the triange ACB is then proportional to the velocity $v$ of the missile the amount of which is transmitted through the rack 70, spur gear and bevel wheels 71, and differential 75, and can be indicated by the shaft 101 whilst the displacement of the nut 64 from the zero position $c$, or the rotation of the shaft 67 is proportional to the component $$\frac{dx}{dt}.$$

This rotation is transmitted to the friction roller 88 of the integrator 89 which forms the integral $$\int \frac{dx}{dt} dt$$

and is applied to the differential 83 where it is algebraically added to an initial value of the range estimated, measured or adjusted by means of the crank 85 so that the differential 83 then continually gives the distance $x_o$ of the missile.

It will be obvious from the above that when the original range $x_o$ has been set by the crank 82, the further changes in range will be transmitted to the shafts 25 and 57. Any changes in either of these quantities will again cause contact at 69 and will cause the motor to change the position of the point B until it is set at the proper range. In this way, after the original range has once been set, the proper range will always be maintained on the shaft $x_o$ merely by following the object with the telescopes.

In Figure 5 a spindle 104 is disposed on a disc 103 and is adjusted in the direction of the vector of the momentary range of the missile by the worm wheel 102 connected to the disc which is rotated by the shaft 57 away from a definite direction corresponding to the shortest distance of the object aimed at, so that the angle between the spindle 104 and the said definite direction equals the angle $\gamma_o$.

The nut 108 is displaced on the spindle through the return differential 105, bevel wheels 106 and 107 proportionally to $x_o$. The pin of the spindle nut 108 which provides the end point of the vector of the momentary range moves the two carriages 109 and 111 displaceable perpendicularly to each other, during its adjustment. The carriage 111 is displaced in the definite direction mentioned by an amount which is proportional to the length K of the perpendicular from the spotting or observation point, for instance, the gun, which is represented by the middle point of the disc 103, to the path of the target, whilst the displacement of the second carriage 109 perpendicularly thereto is proportional to the distance $(vt_o)$ of the momentary position of the target from the point of intersection W of this perpendicular. The carriage 111 carries a spindle 112 transverse to its direction of motion, which spindle is displaced therefore transversely by the movement of the carriage by the amount K from the middle point of this disc 123, the point corresponding to the discharge (observation) point. A nut 113 corresponding to the point of contact can be displaced on this spindle 112 representing the path of the target by a motor 140 through the shaft 115 and bevel wheels 114. A pin on the nut 113 engages in a rack 124 on the disc 123 and effects a rotation of the disc 123 in addition to displacement of this rack during the displacement of the spindle nut. The angle $\gamma_s$ of rotation is supplied to a differential 121 which on the other hand is rotated by the angle $\gamma_o$ of rotation of the disc 103, and forms the difference of these two angles which is applied to a device 136 described with reference to Figures 6a, 6b and 6c.

The rotation of the shaft 115 proportional to the displacement $(vt_s)$ of the spindle nut 113 is transmitted to a differential 117 which on the other hand receives the displacement $(vt_o)$ of the carriage 109 by the wheel 110 and forms the difference $v(t_s - t_o)$. This value is given to a divisional arrangement 118 of suitable construction (for instance, of the type shown in the patents to Meitner, 1,387,551; Barr, 1,493,095; Kaminski, 1,497,512; or Gaedke, 1,788,996) which in addition obtains the value $v$ and gives the value $(t_s - t_o)$. This is transmitted to a differential 138, the centre wheels of which operate a contact device 139 which controls the motor 140. The distance of the spindle nut 113 representing the point of contact from the centre point of the disc 123 corresponding to the point of discharge is supplied as a displacement of the rack 124 through spur gear and bevel wheels 125, return differential 126 and spindle 127 which displaces a carriage 128 proportionally to this distance $x_s$. A rack 129 is displaceable perpendicularly to the direction of motion on the carriage in a guide of this carriage. A displacement of the rack is effected by a small roller 135 which abuts against a cam element 133 formed in correspondence with the function of the flight according to the gun table from the range of the point of contact and the vertex angle for the target at that point. By the fact that the small roller is displaced with the carriage 128 proportional to the range $x_s$ and the cam member 133 is rotated by the shaft 134 coming from the mechanism 136 in dependence upon the vertex angle $\epsilon_s$, the rack 129 is displaced proportionally to the time T of the flight of the shot belonging to the range $x_s$ taking into consideration the vertex angle of the contact point. This displacement is taken up by the gear wheel 130 which is mounted on the carriage 128 and displaceable on the shaft 133 and is transmitted by the shaft 131 to the differential 138.

As long as the movements of rotation of the shafts 131 and 137 are different, the contact mechanism 139 switches the motor 140 on so that the adjusting member 113 is displaced. As soon as both movements of rotation become equal the adjusting member 113 represents the point of intersection to the place of contact, the momentary position being shown by the member 108. The displacement of the rack 124 is then proportional to the range $x_s$ of the point of contact whilst the difference between the angle of rotation of the discs formed by the differential 121 corresponds to the value $\Delta\gamma$ in the plane of flight.

The sighting telescope 150 (Figure 6a) is rotated as a whole continually through the vertex angle $\epsilon_o$ by the shaft 151 and worm gearing 152 about the horizontal axis $a$—$a$ passing through the point of intersection M of the two axes of rotation of the head prism 154. A segmental yoke 116 is provided which is rotatable about a radius of the segment as an axis, that is, about the line BB in Figure 6a. This yoke carries a member 142 which is slidable longitudinally or about the center of the segment. This member 142 carries a mark or marking 143. The originally vertical axis of rotation $m$—$m$ of the head prism of the telescope is thus set at an angle of $90° - \epsilon_o$ to the horizontal axis of rotation of the circular yoke 116. Two adjusting movements for aligning a mark displaced on the yoke by the amount $\Delta\gamma$ are given to the head prism 104 by means of the cranks 167 and 163. The prism with the head part 153 is rotated by means of the crank 167 about the axis $m$—$m$ through return differential 166—bevel wheel 165—bevel wheel segment 164, which is secured to the head part 155, through the lateral angle $\Delta\phi$ (that is the projection on a horizontal plane of the angle $\Delta\gamma$); and by means of the crank 163 about the axis $c$—$c$ through return differential 162 and 161—spur gear wheels 160—bevel wheel segments 159—bevel wheel segment 158, which is loosely rotatable about the head part 153—spur gear wheel segment 157 which is connected to 158.—spur gear wheel 156, the shaft of which is disposed on the head part 153—and bevel wheels 155 through the vertex angle $\epsilon_s$ for the point of contact. If it is necessary to transmit the vertex angle to the gun, the rotation $\epsilon_s$ is given to a differential which on the other hand receives the angle $\epsilon_o$ and continually forms the difference $\Delta\epsilon$.

The mechanism for adjusting the mark corresponding to the point of contact consists of the circular yoke 116 which is rotated about its axis of rotation $MP_o$ by the shaft 141 through the angle $\rho_o$ towards the (vertical) position. The yoke 116 forms the guide for a sliding member 142 which carries the mark 143 corresponding to the point of contact. For adjusting the angle $\Delta\gamma$ the sliding member is correspondingly displaced by the worm gearing 149 through return differential 148—spur gear wheel 147—spur gear wheel 146, which is loosely rotatable about the shaft 141, as well as through spur gear wheel 145—gear wheel 144 and toothed gearing on the sliding member.

The rotations of the cranks 163 and 167 are proportional to $\epsilon_s$ and $\Delta\phi$ and can be transmitted in known manner to the guns. The other ordnance data such as the top angle and timing of the gun can also be determined to known manner from the determining members for the point of contact and can be applied to the guns.

In conclusion it is to be remarked that the mechanisms shown as separate in the drawings for the sake of clearness are in practice best combined in one single apparatus which is therefore used as a central regulating arrangement for directing fire. This is indicated in the drawings by using the same numerals in the figures for identical elements.

I claim:

1. In a fire control arrangement, means for ascertaining the reciprocal value of twice the angular velocity of the object aimed at in the plane of flight with relation to the time, and a mechanical member adjustable to represent the tangent to the curve corresponding to such reciprocal value at the point corresponding to the momentary position of the object aimed at, the angular position of said adjustable member being proportional to the angle of intersection between a perpendicular from the point of observation to the path of the object aimed at and the line from the point of observation to the momentary position of the object in said path.

2. In a fire control arrangement, means for ascertaining the reciprocal value of twice the angular velocity of the object aimed at in the plane of flight with relation to the time, a mechanical member adjustable to represent the tangent to the curve corresponding to such reciprocal value at the point corresponding to the momentary position of the object aimed at, the angular position of said adjustable member being proportional to the angle of intersection between a perpendicular from the point of observation to the path of the object aimed at and the line from the point of observation to the momentary position of the object in said path, and means for integrating the angular velocity with respect to the time whereby said angle of intersection is automatically ascertained during movement of the object.

3. In a fire control arrangement, means for ascertaining the reciprocal value of twice the angular velocity of the object aimed at in the plane of flight with relation to the time, a mechanical member adjustable to represent the tangent to the curve corresponding to such reciprocal value at the point corresponding to the momentary position of the object aimed at, the angular position of said adjustable member being proportional to the angle of intersection between a perpendicular from the point of observation to the path of the object aimed at and the line from the point of observation to the momentary position of the object in said path, and means for integrating the angular velocity with respect to the time and for adding said integral algebraically to the said angle of intersection, whereby the said angle of intersection is automatically and continuously ascertained during movement of the object.

4. In a fire control arrangement, a disc, means for rotating said disc through an angle equal to the angle of intersection between a perpendicular from the observation point to the path of the object aimed at and the line from the point of observation to the momentary position of the object in that path, said means comprising means for ascertaining the reciprocal value of twice the angular velocity of the object aimed at in the plane of flight with relation to the time, and a mechanical member adjustable to represent the tangent to the curve corresponding to such reciprocal value at the point corresponding to the momentary position of the object aimed at, a carriage displaceable transversely to the axis of said disc, a coupling member connecting said carriage and said disc, the component of the distance from the point of connection of the coupling member and carriage to the axis of the disc in a direction transverse to the movement of the carriage being proportional to the change in the range to the object aimed at, the distance from said last point to the axis of the disc being proportional to the velocity of the object aimed at.

5. In a fire control arrangement, a disc, means for rotating said disc through an angle equal to the angle of intersection between a perpendicular from the observation point to the path of the object aimed at and the line from the point of observation to the momentary position of the object in that path, said means comprising means for ascertaining the reciprocal value of twice the angular velocity of the object aimed at in the plane of flight with relation to the time, and a mechanical member adjustable to represent the tangent to the curve corresponding to such reciprocal value at the point corresponding to the momentary position of the object aimed at, a carriage displaceable transversely to the axis of said disc, a coupling member connecting said carriage and said disc, the component of the distance from the point of connection of the coupling member and carriage to the axis of the disc in a direction transverse to the movement of the carriage being proportional to the change in the range to the object aimed at, the distance from said last point to the axis of the disc being proportional to the velocity of the object aimed at, means for moving said carriage by distances proportional to the component of the velocity of the object aimed at transverse to the line from the point of observation to the object, and means for integrating the said change in range and for adding it to the initial range whereby the range at any moment is automatically ascertained.

6. In a fire control arrangement, a pair of slotted guides movable in directions perpendicular to one another, a member movable in a plane substantially parallel to the common plane of movement of said guides and having means engaging the slots in the guides, means for turning said member through an angle equal to the angle between a perpendicular from the observation point to the path of the object aimed at and a line from the observation point to the momentary position of the object in that path, means for moving said engaging means by a distance proportional to the range to the momentary position of the object, whereby the movement of one of said guides by said engaging means represents the length of the perpendicular to the path while the movement of the second guide represents the distance from the intersection of said perpendicular with said path to the momentary position of the object, an element connected to said first guide and movable therewith in parallel relation thereto, a member mounted on said element and movable thereon in a direction perpendicular to the direction of movement of said first guide, means for moving said member including means controlled by the difference between the times of flight of the object from the point of intersection of the perpendicular with the path of the object to the momentary position of the object and to the point of intersection of the path of the missile with the path of the object, the movement of said member in excess of the movement of said second guide being proportional to the gun table value of the time of flight of the missile to said last point of intersection and means controlled by movement of said movable element and member for automatically determining the range to said last point.

7. In a fire control arrangement, a telescope, means for turning said telescope in horizontal and vertical planes to follow the object aimed at, means for integrating the movements of said telescopes to give the horizontal and vertical angle velocities of the object, means for multiplying the said horizontal angle velocity by the cosine of the angle of inclination of the momentary position of the object, means for dividing the product of said multiplication by said vertical angle velocity to obtain the tangent of the angle between the plane of flight and the plane of the object, and means for converting said tangent into the rotation of a shaft by an amount equal to said last angle.

8. In a fire control arrangement, a telescope, means for turning said telescope in horizontal and vertical planes to follow the object aimed at, means for integrating the movements of said telescopes to give the horizontal and vertical angle velocities of the object, means for multiplying the said horizontal angle velocity by the cosine of the angle of inclination of the momentary position of the object, means for dividing the product of said multiplication by said vertical angle velocity to obtain the tangent of the angle between the plane of flight and the plane of the object, and means for converting said tangent into the rotation of a shaft by an amount equal to said last angle, together with means to add the squares of the said product and vertical angle velocity, and to convert the square root of the sum of such addition to rotation of a shaft proportional to the angle velocity in the plane of flight.

9. In a fire control apparatus, means for measuring the angle of inclination of the momentary position of the object aimed at and the horizontal and vertical angle velocities, means for determining from these quantities the angle velocity in the plane of flight and the second angle between the plane of the object and the plane of flight, means for finding the third angle between the perpendicular to the path of the object and the line to the momentary position of the object including means to represent the curve of the reciprocal value of twice the angle velocity in the plane of flight and the tangent to said curve, means for multiplying the range by the angle velocity in the plane of flight to determine the transverse vector velocity in the plane of flight, means for combining said vector velocity with said third angle to find the variation in range, means to constantly integrate said variation in range to obtain the range, means to combine said vector velocity and said change in range to find the velocity, and means to combine the velocity, the range and the third angle including a member graduated according to the range table functions of the time of flight of the missile to obtain the time of flight of the missile and the range to the point of intersection of the path of the missile with the path of the object.

In witness whereof I have hereunto set my signature.

ETTORE BUSSEI.